US009657455B2

(12) United States Patent
Wilson

(10) Patent No.: US 9,657,455 B2
(45) Date of Patent: May 23, 2017

(54) OVER-THE-STERN DEEP DIGGING TRENCHING PLOW WITH INSTRUMENTATION FOR ASSESSING THE PROTECTIVE CAPABILITIES OF A SEABED TRENCH

(71) Applicant: Michael W. N. Wilson, Aberdeenshire (GB)

(72) Inventor: Michael W. N. Wilson, Aberdeenshire (GB)

(*) Notice: Subject to any disclaimer, the term of this patent is extended or adjusted under 35 U.S.C. 154(b) by 83 days.

(21) Appl. No.: 14/749,032

(22) Filed: Jun. 24, 2015

(65) Prior Publication Data
US 2016/0376766 A1     Dec. 29, 2016

(51) Int. Cl.
| | | |
|---|---|---|
| *E02F 5/02* | (2006.01) | |
| *E02F 5/14* | (2006.01) | |
| *E02F 3/90* | (2006.01) | |
| *B63B 35/00* | (2006.01) | |
| *E02F 5/10* | (2006.01) | |
| *E02D 1/00* | (2006.01) | |

(52) U.S. Cl.
CPC ............. *E02F 5/027* (2013.01); *B63B 35/00* (2013.01); *E02D 1/00* (2013.01); *E02F 3/907* (2013.01); *E02F 5/106* (2013.01); *E02F 5/145* (2013.01)

(58) Field of Classification Search
CPC ... E02F 3/907; E02F 3/90; E02F 5/027; E02F 5/106; E02F 5/14; E02F 5/145; E02D 1/00
See application file for complete search history.

(56) References Cited

U.S. PATENT DOCUMENTS 3,600,674 A * 8/1971 Roberts .................. G01R 31/11
174/11 R
4,129,992 A   12/1978 Carlsson
(Continued)

FOREIGN PATENT DOCUMENTS

WO       0121900      3/2001
WO     2015071637    5/2015

OTHER PUBLICATIONS

"Pipeline Backfill Plough"—product description from SMD Co.; provided on website as of Dec. 8, 2015, https://smd.co.uk/products/ploughs-towed/bp.htm. Also see "A-1." 3 pages.
(Continued)

*Primary Examiner* — Jamie L McGowan
(74) *Attorney, Agent, or Firm* — Frank J. Catalano; Gable Gotwals

(57) ABSTRACT

A seabed trenching plow has a chassis, a sled and a towing assembly. The towing assembly has a pair of wings extending laterally from each side of the chassis. The wings are aligned on an axis transverse to the chassis and adapted for connection to a towing line. The transverse axis is forward of the center of gravity of the plow and rearward of the sled, affording an over the stern releasable and retrievable trenching plow of sufficient weight and strength to excavate a three meter trench in a single pass. To assess the protective capabilities of the trench, a threshold signal indicative of a desired composition of seabed-trench soil is compared with a real-time data signal indicative of the actual to produce an alarm signal when the real-time data signal is not protective-capability compliant with the threshold signal.

3 Claims, 8 Drawing Sheets

(56) References Cited

U.S. PATENT DOCUMENTS

| | | | | |
|---|---|---|---|---|
| 4,280,288 A * | 7/1981 | Corfa | E02F 5/006 37/308 |
| 5,172,497 A * | 12/1992 | Lemonds | E02F 3/907 37/308 |
| 5,491,913 A * | 2/1996 | Hutchinson | E02F 3/902 37/311 |
| 6,041,527 A * | 3/2000 | Hostetler | B63H 15/00 37/307 |
| 7,877,970 B1 * | 2/2011 | Crosby | A01D 37/00 56/10.2 R |
| 8,393,137 B1 * | 3/2013 | Crosby | A01D 91/04 56/341 |
| 2008/0016726 A1 * | 1/2008 | Blume | E02F 1/00 37/309 |
| 2008/0133128 A1 * | 6/2008 | Koch | E02F 3/435 37/348 |
| 2008/0282583 A1 * | 11/2008 | Koellner | E02F 3/304 37/348 |
| 2009/0000154 A1 * | 1/2009 | Hartwick | E02F 9/2029 37/347 |
| 2014/0150303 A1 | 6/2014 | Wilson | |
| 2014/0154014 A1 | 6/2014 | Wilson | |
| 2015/0305226 A1 * | 10/2015 | Zemenchik | A01B 71/02 701/50 |

OTHER PUBLICATIONS

"Variable Multipass Plough"—product description from SMD Co.; provided on website as of Oct. 29, 2015. https://smd.co.uk/products/ploughs-towed/mp.htm. Also see "B-1." 3 pages.

"Pipeline Ploughs"—product description from IHC EB; provided on website as of Oct. 29, 2015. http://www.ihceb.com/subsea-technologies/subsea-technologies/pipeline-ploughs/. 1 pg.

Power Cable Plough—product description from IHC EB; provided on website as of Dec. 8, 2015. http://www.ihceb.com/subsea-technologies/subsea-technologies/sea-stallion-cable-plo. 1 page.

* cited by examiner

OVER-THE-STERN DEEP DIGGING TRENCHING PLOW WITH INSTRUMENTATION FOR ASSESSING THE PROTECTIVE CAPABILITIES OF A SEABED TRENCH

BACKGROUND

This invention relates generally to seabed plows and more particularly concerns a deep digging over-the-stern trenching plow with instrumentation for assessing the protective capabilities of a seabed trench.

The present practices and equipment, typically requiring cranes and associated heavy equipment and structures, used to release and retrieve a plow from a vessel into the sea and from the sea onto the vessel typically limit the weight of the plow to a maximum of approximately 20 tons. The trenching depth and strength of known plows are compromised accordingly.

The depth achievable in the first trenching pass of these known 20 ton trenching plows is at best 1.4 meters. Deeper trenches can be dug by multiple passes, but the deeper the trench and the greater the number of passes, the greater the forces applied to the limited strength plow. Therefore, even when multiple passes of known trenching plows are run, a trench depth of approximately 2.7 meters is the most that can be expected. But, in many applications, trenches three meters deep may be insufficient to protect their buried contents. Consider, for example, the impact forces that might be applied to a pipeline buried in a trench located in an iceberg zone.

On the other hand, there is a plow weighing 200 tons that requires use of an A-frame or crane for launch and retrieval and can achieve a first pass depth of 2.0 meters and a maximum total depth of 2.7 meters. The maximum depth of 2.7 meters is dictated because the configuration required of the plow for launch and retrieval by A-frame or crane does not afford a plow of sufficient strength to withstand the forces that will be incurred in excavating a trench greater than 3.0 meters in depth, regardless of the number of passes used for the purpose.

Assuming that a suitable seabed trench can be excavated, the capability of the trench to protect pipelines, cables and other objects laid or buried in a seabed trench is a foremost concern. For example, the likelihood that damage may be caused by icebergs and other undersea objects drifting or otherwise moving in the vicinity of the trench is a function of the composition of the soil in which the object is laid or buried and the depth at which the object is laid or buried in the soil.

Plow tip sensors are presently used to measure the shearing force applied by the tip of the plow to the seabed. Load cells are also presently used to measure the total tow force applied to the trenching plow. It is presently understood that the difference between the measured shearing and total tow forces will be generally indicative of the non-tip forces applied to the plow. Such information is useful to understanding the orientation of and the forces applied to the plow during the trenching process but does not afford an assessment of the protective capabilities of a trench.

The assessment is complicated because the composition of the soil may change considerably along the path of the trench and the depth of the trench along its path may vary somewhat from the depth expected from a given design and adjustable configuration of the trenching plow.

It is, therefore, an object of this invention to provide a trenching plow capable of digging trenches deeper than can be dug by known trenching plows. It is also an object of this invention to provide a method for over-the-stern release and retrieval of a deep digging trenching plow from a vessel into the sea and from the sea onto the vessel. It is another object of this invention to provide a method and instrumentation for assessing, on a real-time basis, the ability of a trench to protect objects laid or buried in the trench from damage by the impact of external objects.

SUMMARY OF THE INVENTION

In accordance with the invention a seabed trenching plow has a chassis, a sled connected to a forward end of the chassis by uprights and a towing assembly. The towing assembly has a pair of wings extending laterally from each side of the chassis. The wings are aligned on an axis transverse to the chassis and adapted for connection to a towing line. The transverse axis is forward of the center of gravity of the plow and rearward of the connection point of the sled uprights to the chassis.

The method of releasing the seabed plow from a deck of a vessel having a stern roller includes the steps of connecting the plow to a towing line at a point forward of a center of gravity of the plow and rearward of the sled uprights, causing the plow to traverse along the deck and over the stern roller and allowing the plow to rotate by gravitation about the stern roller until the plow is suspended by the towing line from the vessel aft of the stern roller.

The method of retrieving the seabed plow from the deck of the vessel includes the steps of raising the plow from the seabed to the stern roller at the end of a towing line connected to the plow at a point forward of a center of gravity of the plow and rearward of the sled uprights and pulling the chassis to traverse against and rotate about the stern roller until the plow is resting on the deck of the vessel.

Also in accordance with the invention, a method for assessing the protective capabilities of a seabed trench includes the steps of generating a threshold signal indicative of a desired composition of seabed-trench soil for a specific application, pulling a trenching plow having a plow share with a soil-analyzing tip along an intended trench path in the seabed, generating a real-time data signal in response to the composition of the soil analyzed by the soil-analyzing tip along the intended trench path and comparing the real-time data signal to the threshold signal to produce an alarm signal when the real-time data signal is not protective-capability compliant with the threshold signal.

The step of generating the real-time data signal may include the sub-steps of measuring the force required to pull the soil-analyzing plow tip through the soil, the sleeve friction of the soil, the pore pressure of the soil and the total pull force applied by the pulling mechanism to the plow and combining the measured data according to an algorithm predetermined to produce a signal indicative of the composition of the soil being analyzed by the soil-analyzing plow tip.

The sub-step of measuring may also include measuring the depth of the soil-analyzing plow tip.

BRIEF DESCRIPTION OF THE DRAWINGS

Other objects and advantages of the invention will become apparent upon reading the following detailed description and upon reference to the drawings in which.

While the invention will be described in connection with a preferred embodiment thereof, it will be understood that it is not intended to limit the invention to those embodiments or to the details of the construction or arrangement of parts illustrated in the accompanying drawings.

DETAILED DESCRIPTION

Figure 1:
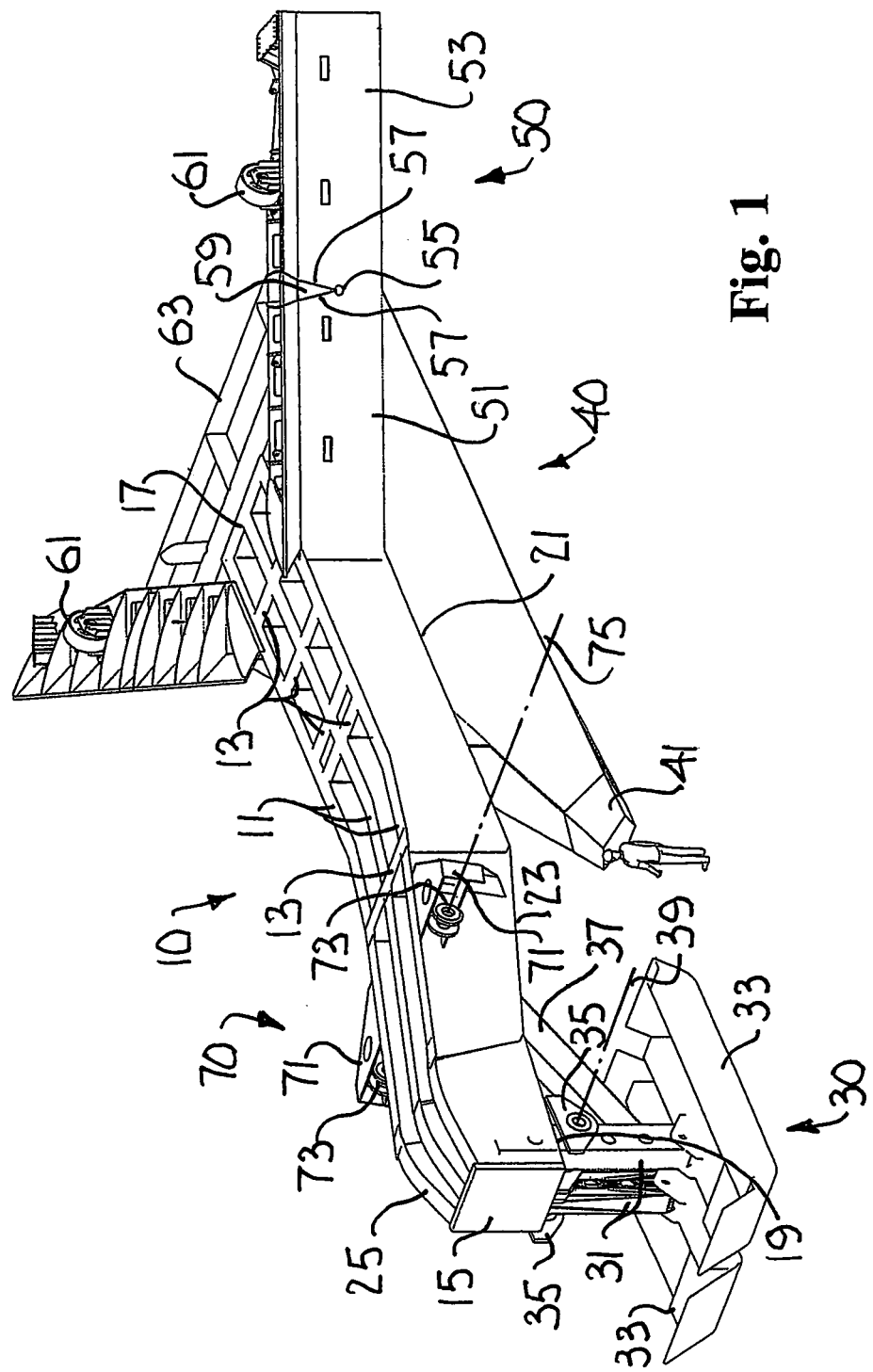
FIG. 1 is a perspective view of an over-the-stern trenching plow utilizing a towing line assembly according to the invention.
Figure 2:
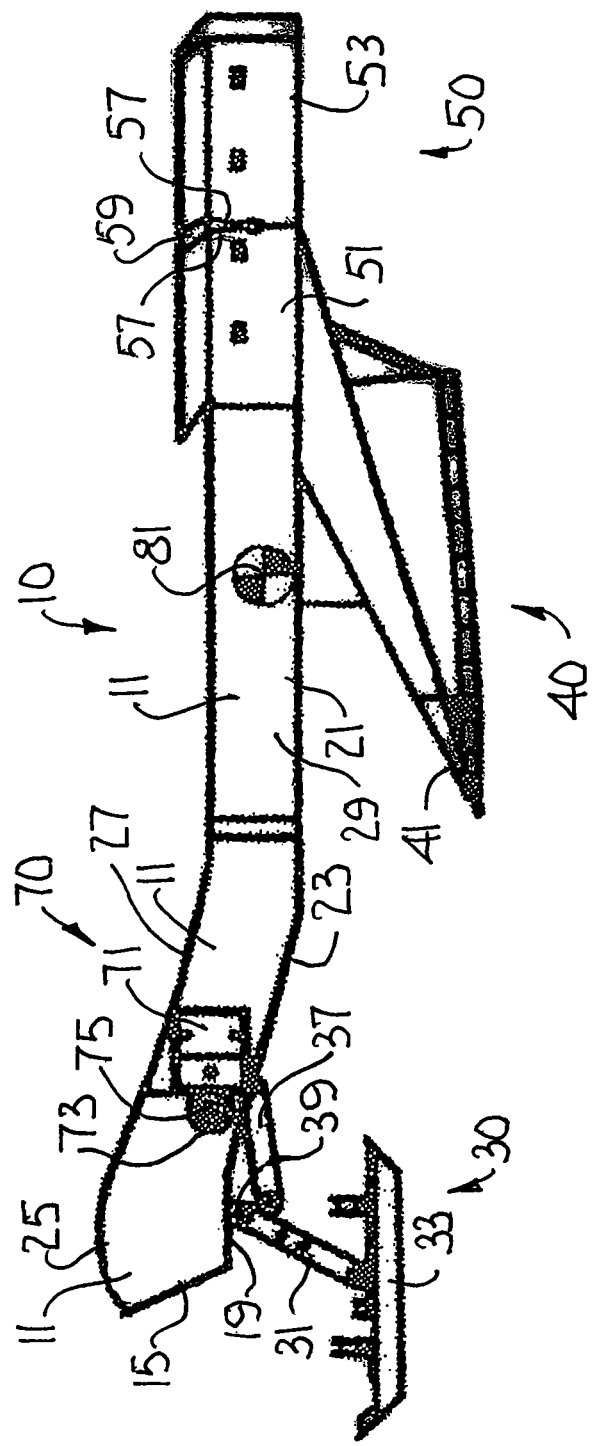
FIG. 2 is a side elevation view of the over-the-stern trenching plow of FIG. 1.

Turning first to FIGS. 1 and 2, a trenching plow weighing as much as 100 tons or more includes a chassis 10, a sled 30, a plow share 50, moldboards 60 and a towing assembly 80.

The chassis 10 shown has three elongated vertical plates 11 spaced by transverse vertical reinforcing plates 13 and extending from a nose plate 15 to an end plate 17. The bottom of the chassis 10 lies in fore and aft horizontal planes 19 and 21 with an intermediate plane 23 angled downwardly fore to aft. The chassis 10 has a convex nose 25 beginning at the top edge of the nose plate 15 and transitioning into a downwardly angled midsection 27 followed by a horizontal end section 29 extending to the top edge of the end plate 17.

The sled 30 is mounted on the chassis 10 below its nose 25. Uprights 31 are pivotally pinned between the sled skids 33 and brackets 35 mounted on the underside of the nose 25 and a reinforcing strut 37 is pivotally pinned between the uprights 31 and the angled midsection 27 of the chassis 10. The uprights 31 and reinforcing strut 37 are apertured and pinned to permit adjustment of the vertical distance between the chassis nose 25 and the angle of the uprights 31 with respect to vertical. The sled uprights 31 are pinned to the chassis nose brackets 35 on a common axis 39.

The plow share 40 as shown is mounted in any known manner against the bottom of the horizontal end portion 29 of the chassis 10, as shown under the aft section 17 of the chassis 10, with the tip 41 of the plow extending forward to approximately a point below the junction of the angled midsection 27 of the chassis 10 with the horizontal end portion 29 of the chassis 10. The plow share 40 is in shape generally similar to known plow shares. However, its tip 41 is considerably further below its chassis 10 than the tips of known plow shares, the present plow tip 41 being as much as three meters below the chassis 10 in comparison to known plow tips which are no more than 1.4 meters below their chassis. Its weight is significantly greater than the weight of most known plow shares, the present plow share 40 weighing as much as 100 tons or more in air in comparison to known plow shares which weigh no more than 40 tons in air. Its width may be, but is not necessarily, wider than the width of known plow shares, the present plow share 40 being as much as nine meters wide in comparison to known plow shares which are no more than 4.2 meters wide.

The moldboards 50 are mounted in any known manner against the outer aft-most faces of the outer vertical elongated plates 11. The moldboards 50 are generally similar to known moldboards, though their weight may be, but is not necessarily, significantly greater than the weight of known moldboards, the present moldboards 50 weighing as much as ten tons in comparison to known moldboards which weigh no more than two tons. Preferably, each of the moldboards 50 is divided into proximal and distal sections 51 and 53 joined by hinge pins 55 at angled-cut ends 57. Wedges 59 can be inserted above or below the hinge pins 55 so that the bottom of the moldboard distal sections 53 can be locked in either a horizontal or upwardly angled condition relative to the bottom of the proximal sections 51 of the moldboards 50. As seen in FIG. 1, the moldboards 50 are preferably provided with rollers 61 so as to reduce friction when the moldboards 50 traverse the deck of a vessel and a connecting frame 63 providing reinforcement between the distal sections 53 of the moldboards 50.

As shown, a towing assembly 70 is located on the downwardly angled midsection 27 of the chassis 10 aft of the connection point of the sled uprights 31 to the chassis nose 25. In the embodiment shown, the towing assembly 70 includes wings 71 mounted against the outer faces of the outer vertical elongated plates 11. Each wing 71 carries mounting rings 73 aligned on a common axis 75 to facilitate connection, perhaps in a clevis fashion, to a tow line (not shown).

Looking at FIG. 2, the key parameters of the present trenching plow are the locations of its center of gravity 81, of the connecting axis 39 between the sled uprights 31 and the chassis nose brackets 35 and the common axis 75 of the towing assembly mounting rings 73. In accordance with the invention, the common axis 75 of the towing assembly mounting rings 73 must fall between the sled upright connecting axis 39 and the plow center of gravity 81.

Preferably, and as shown, the center of gravity 81 of the present plow, which weighs as much as 100 tons or more, is approximately 15 meters aft of the sled upright connecting axis 39 and the common axis 75 of the towing assembly mounting rings 73 is approximately midway between the center of gravity 81 and the sled upright connecting axis 39. In comparison, known trenching plows have a center of gravity approximately 5-6 meters aft of the nose of the plow, about ⅓ to ⅖ the distance of the present plow, and a tow line connection point forward of the uprights. Therefore, the present plow results in a moment as much as 12.5 to 15 times that of known plows.

In practice, the towing line connection assembly 70 can be located to position the common axis 75 of the towing assembly mounting rings 73 anywhere between the center of gravity 81 and the sled upright connecting axis 39. However, the closer the common axis 75 of the mounting rings 73 is to the center of gravity 81 the better, so long as it is forward of the center of gravity 81.

The configuration and weight of the chassis 10, sled 30, plow share 50, moldboards 50 and towing assembly 70 are coordinated to position the center of gravity 81 of the plow at a location affording a resulting moment suitable to a given 20 to 100 ton or more trenching plow application.

Looking at FIGS. 3A-3H, assume a plow weight of 96 tons and a center of gravity 81 approximately 15 meters aft of the sled upright connecting axis 39. The transition of the over-the-stern trenching plow across the stern roller R of a transporting/towing vessel V during retrieval from the sea W is sequentially shown from a point $P_1$ of first contact with the roller R to a point $P_8$ at which the plow has entirely traversed the roller R and is at rest on the deck D of the vessel V.

Figure 3A:
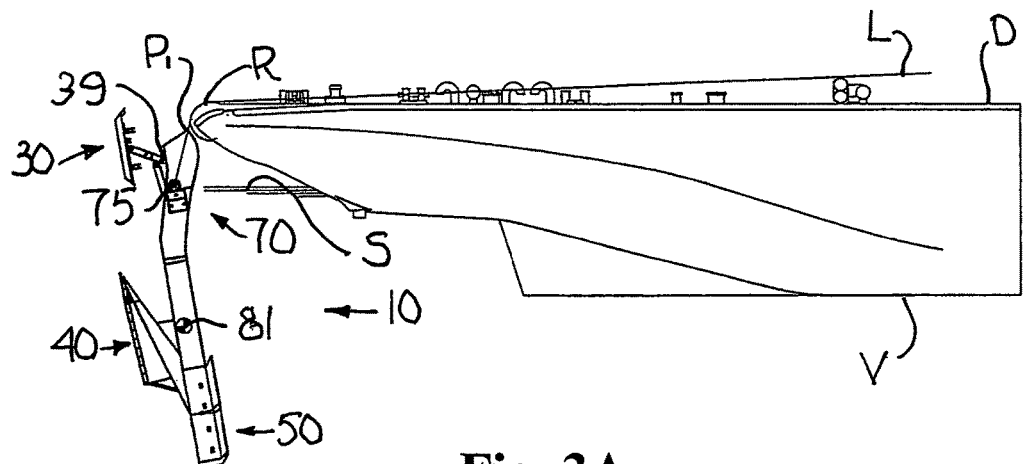
FIGS. 3A-3H are side elevation views of the over-the-stern trenching plow of FIG. 1 in sequential transition orientations during retrieval of the over-the-stern trenching plow from the sea to the stern deck of a transporting/towing vessel.

Beginning with FIG. 3A, the plow has been retrieved at the end of a winch driven tow line L to the point $P_1$ with the plow oriented for contact between the roller R and the top surface of the nose 25. The towline L remains turned on the roller R. In this orientation, the moment of the plow about the roller R is near minimal.

Figure 3B:
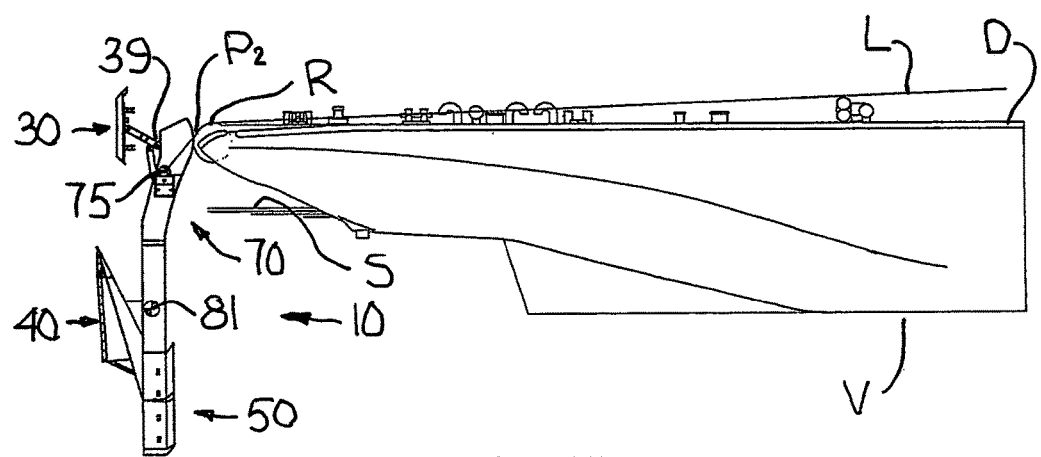

As is seen in FIG. 3B, the plow has been further retrieved to a point $P_2$ at which the apex of the convex nose 25 is in contact with the roller R, the towline L remains turned on the roller R and the center of gravity 81 of the plow has rotated the slightly astern of its position in FIG. 3A. In this orientation, because of the convex structure of the nose 25 and the sternward shift of the center of gravity 81, the moment of the plow about the roller R is greater but still near minimal.

Figure 3C:
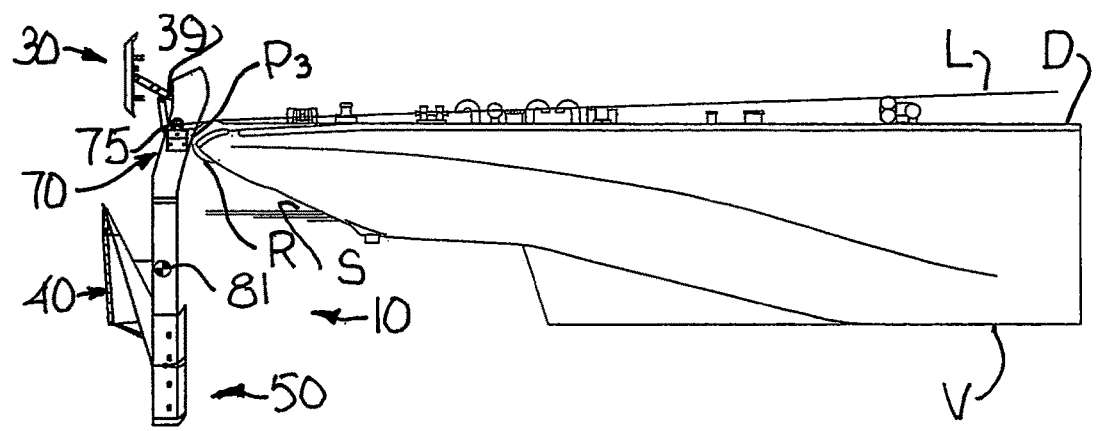

As is seen in FIG. 3C, the plow has been further retrieved to a point $P_3$ at which the common axis 75 of the towing assembly mounting rings 73 is above the contact point $P_3$ and below the high point of the roller R, so that the towline L is slightly turned on the roller R. Also, the contact point $P_3$ has shifted to the downwardly angled midsection 27 of the chassis 10. The center of gravity 81 of the plow has rotationally shifted further slightly sternward but very little net shift of the center of gravity 81 has occurred because of the angled midsection 27 of the chassis 10. Therefore, in this orientation, the moment of the plow about the roller R is substantially the same as in FIG. 3B, which is still near minimal.

Figure 3D:
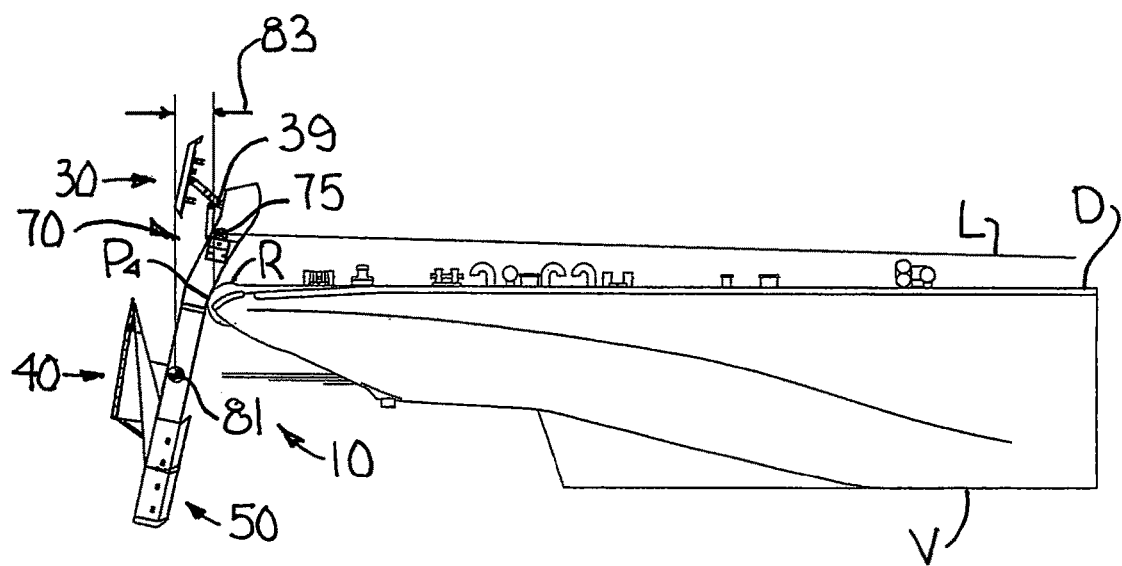

As is seen in FIG. 3D, the plow has been further retrieved to a point $P_4$ at the junction of the downwardly angled midsection 27 and the horizontal end section 29 of the chassis 10. The common axis 75 of the towing assembly mounting rings 73 has shifted above the roller R. The towline L no longer contacts the roller R and has levered the chassis 10 at the fulcrum point $P_4$ to shift the center of gravity 81 of the chassis 10 to approximately 2.334 meters 83 astern of the fulcrum point $P_4$, creating a total moment of 224.1 metric ton-meters.

Figure 3E:
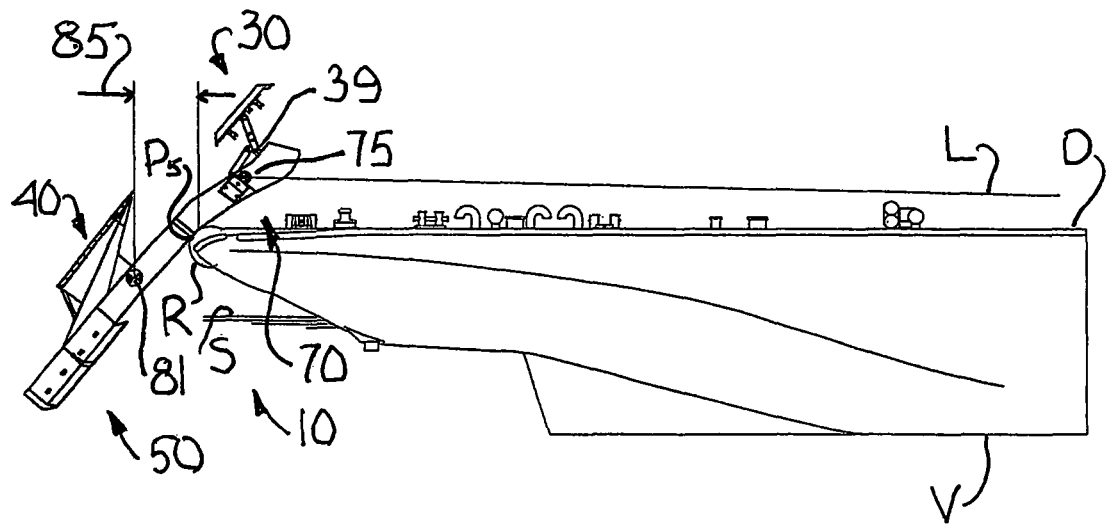

As is seen in FIG. 3E, the continued pull of the towline L has caused the horizontal end section 29 of the chassis 10 to advance slightly on the roller R and has significantly levered the chassis 10 at the fulcrum point $P_5$ to further shift the center of gravity 81 of the chassis 10 to approximately 3.768 meters 85 astern of the fulcrum point $P_5$ creating a total moment of 362 metric ton-meters.

Figure 3F:
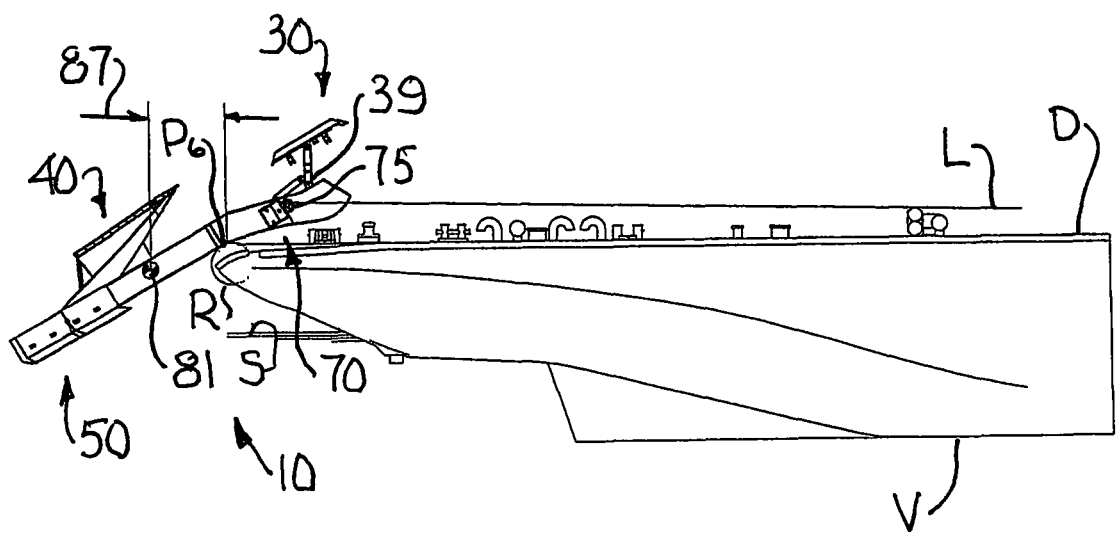

As is seen in FIG. 3F, further continued pull of the towline L has caused the horizontal end section 29 of the chassis 10 to advance more significantly on the roller R, levering the chassis 10 at the fulcrum point $P_6$ to further shift the center of gravity 81 of the chassis 10 to approximately 4.518 meters 87 astern of the fulcrum point $P_6$, creating a total moment of 433.9 metric ton-meters, the maximum total moment of the retrieval process.

Figure 3G:
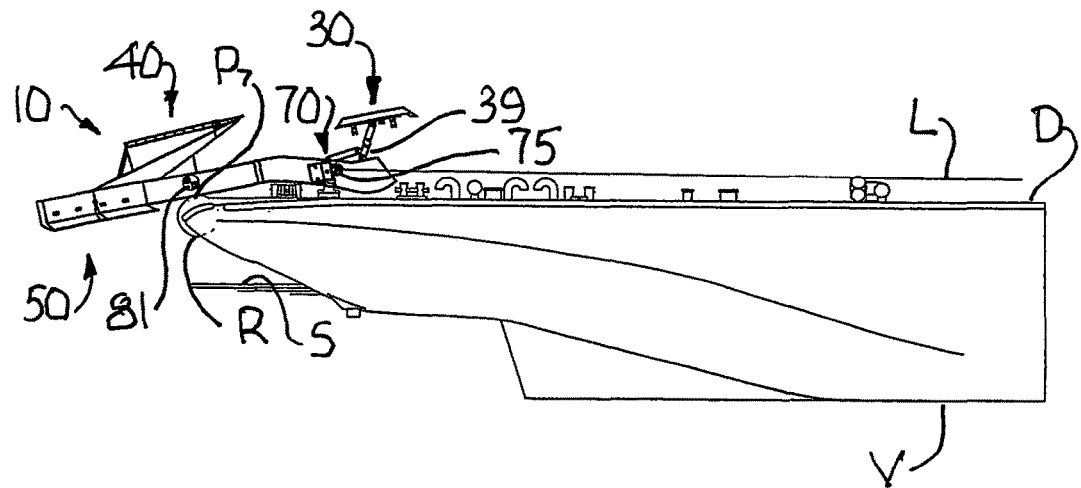

As is seen in FIG. 3G, further continued pull of the towline L has caused the chassis 10 to advance until the center of gravity 81 of the chassis 10 is substantially but not quite directly above the contact point $P_7$, reducing the total moment of the plow about the roller R once again to near minimal.

Figure 3H:
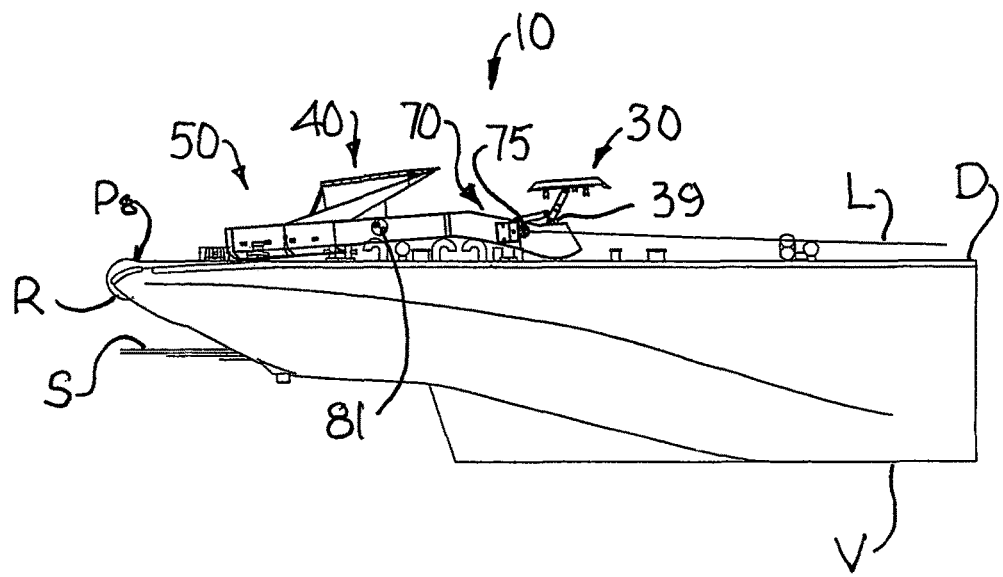

Finally, looking at FIG. 3H, further continued pull of the towline L has caused the chassis 10 to advance until the plow is entirely forward of the stern roller R and the plow is resting on the deck D of the vessel V.

The release of the plow from the deck D of the vessel V into the sea S is essentially the reverse of the retrieval process illustrated in FIGS. 3A-3H, except that independent winch lines are used to pull the plow in the opposite direction across the stern roller R, as by a block-and-tackle assembly, against the tension of the towing line L.

Figure 4:
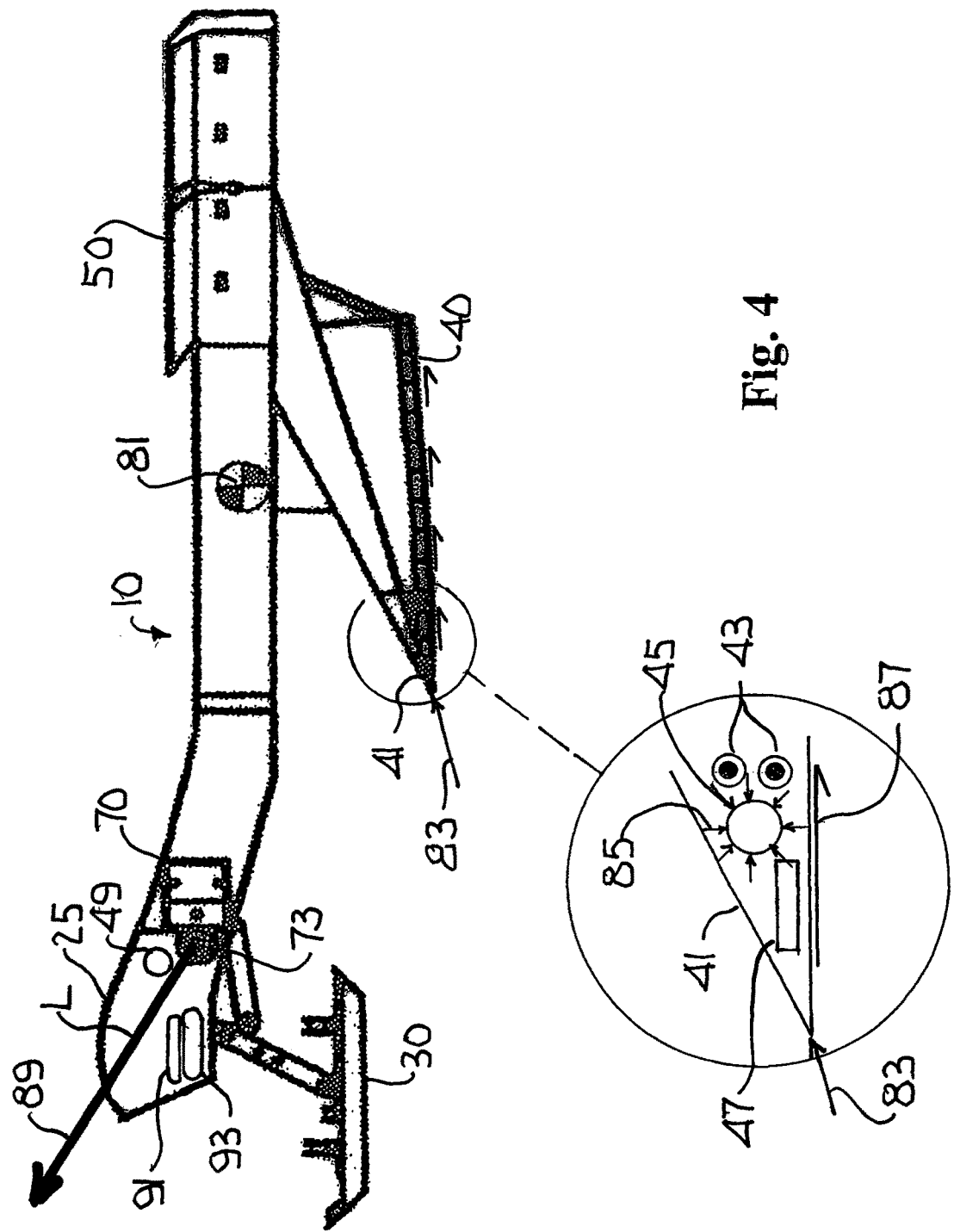
FIG. 4 is a side elevation view of the plow of FIG. 1 equipped with trench soil assessment instrumentation in accordance with the invention.

Turning now to FIG. 4, in order to assess the protective capabilities of a seabed trench dug by a trenching plow such as the plow of FIG. 1, the plow share 40 is equipped with a soil-analyzing tip 41. The soil-analyzing tip 41 includes load pins 43, a pressure sensor 45 and a friction sensor 47. The load pins 43 measure the tip reaction force 83 which is the force required to pull the soil-analyzing plow tip 41 through the soil. For example, the plow design may anticipate a tip reaction force 83 up to 650 tons. The pressure sensor 45 measures the pore pressure 85 of the soil passing under the plow tip 41. The friction sensor 47 measures the sleeve friction 87 of the soil passing under the plow tip 41. A load cell 49 is located on the plow or elsewhere in a position suitable to measure the total pull force 89 applied to the plow via the tow line L by its pulling mechanism, such as one or more vessels or winches.

For example, the plow design may anticipate that a total pull force 89 on the plow will be in a range of 200 to 250 tons. Since the total pull force 89 is measured and the offsetting tip reaction, sleeve and friction forces 83, 85 87 are also measured, the forces exerted on the plow share 40 between the plow tip 41 and the bottom of the chassis 10, a distance in the range of 3 meters, is calculable.

Figure 5:
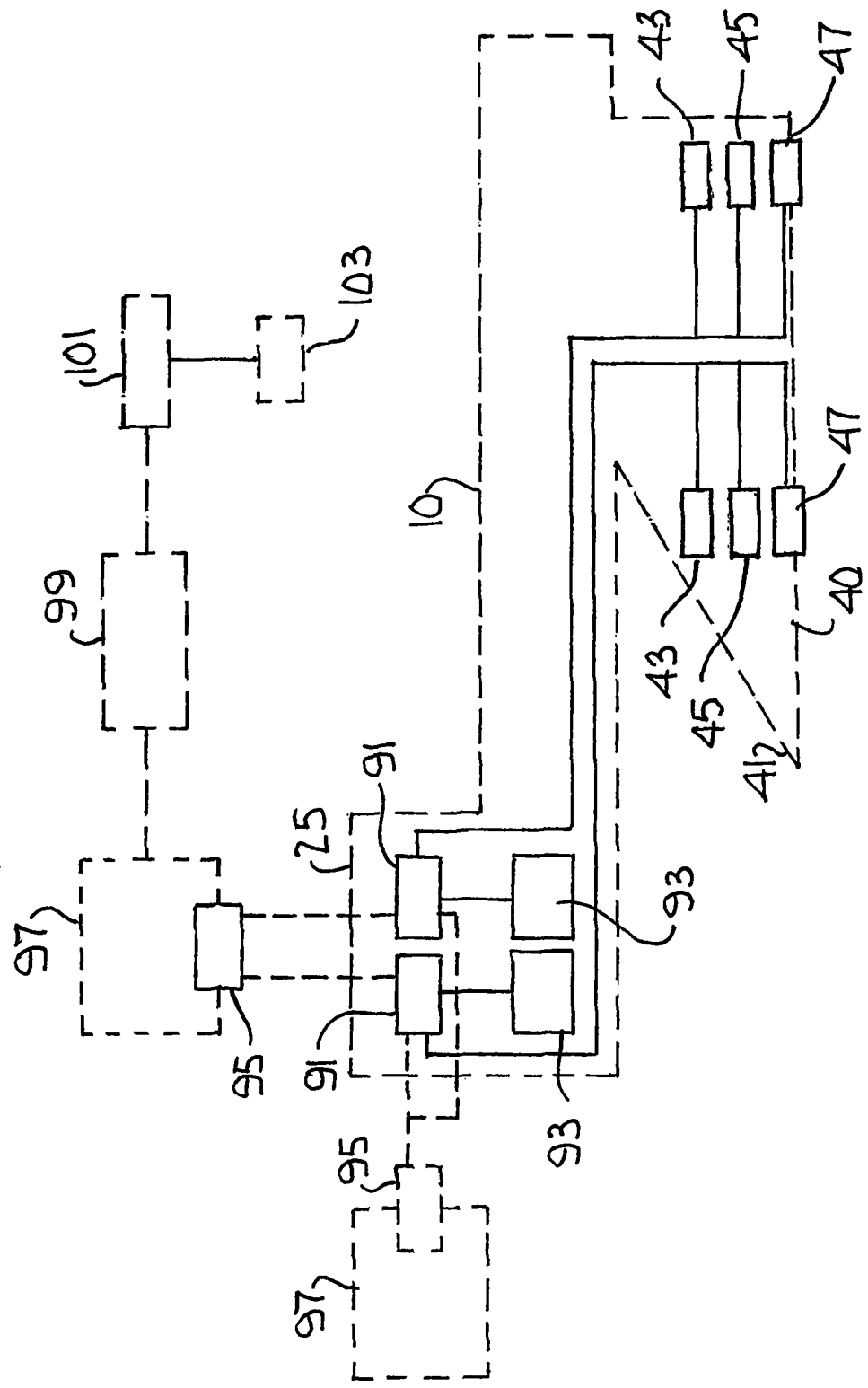
FIG. 5 is a schematic diagram of the trench soil assessment instrumentation of FIG. 4.

Turning to FIG. 5, data transfer units 91 powered by batteries 93 are cable-connected to the sensors 43, 45 and 47 in the plow tip 41 and collect data to be received by remote data receiving units 95 which may, for example, be located on remote operated vehicles 97 in communication with a vehicle controller 99, a plow controller 101 and a GPS device 103. The data transfer units 91 may, for example, be SENTOOTH 100® data transfer units.

In operation, the method for assessing the protective capabilities of a seabed trench includes the steps of generating a threshold signal indicative of a desired composition of seabed-trench soil for a specific application. The trenching plow, which has a plow share 40 with a soil-analyzing tip 41, is pulled along an intended trench path in the seabed. As the plow is pulled along the intended path, a real-time data signal is generated in response to the composition of the soil analyzed by the soil-analyzing tip 41. The data signal is herein identified as being a real-time signal because the amplitude of the signal is coordinated to the position of the plow along the length of the trench. If and when the soil is backfilled into the trench to further increase the protective capability of the trench, within reasonable limitations, the backfilled soil will be the soil that was excavated and analyzed during trenching, so that the data signal substantially accurately indicates the varying composition of the soil along the backfilled trench. If the trench is not backfilled, the data signal will even more closely indicate the varying composition of the soil defining the trench.

The real-time data signal is then compared to the threshold signal to produce an alarm signal when the real-time data signal is not protective-capability compliant with the threshold signal.

The step of generating a real-time data signal may include two sub-steps. The force required to pull the soil-analyzing plow tip through the soil, the sleeve friction of the soil, the pore pressure of the soil and the total pull force applied by the pulling mechanism to the plow are all measured as the plow is pulled along the intended trench path. The measured data is combined according to an algorithm predetermined to produce a signal indicative of the composition of the soil being analyzed by the soil-analyzing plow tip. The algorithm may be standardized or unique to a given application so as to weigh the measured data according to the desired predominance of its importance in a given protective capability analysis.

The sub-step of measuring may also include measuring the depth of the soil-analyzing plow tip for inclusion in the measured data being combined according to the algorithm so as to enable accounting for depth variations that may occur along the length of the trench.

By way of example, a suitable algorithm might weigh the plow tip reaction force, the sleeve friction of the soil, the pore pressure of the soil, the total pull force applied to the plow and the deviation of the depth of the trench from a predetermined depth as 70%, 10%, 10%, 5% and 5%, respectively.

Thus, it is apparent that there has been provided, in accordance with the invention, an improved over-the-stern trenching plow and a method of releasing and retrieving the plow from the vessel into the sea and from the sea onto the vessel and a method and instrumentation for assessing the protective capabilities of a seabed trench that fully satisfy the objects, aims and advantages set forth above. While the invention has been described in conjunction with a specific embodiment thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. For use in assessing the protective capabilities of a seabed trench, a method comprising the steps of:

generating a threshold signal indicative of a desired composition of seabed-trench soil for a specific application;

pulling a trenching plow having a plow share with a soil-analyzing tip along an intended trench path in the seabed;

generating a real-time data signal in response to the composition of the soil analyzed by the soil-analyzing tip along the intended trench path; and comparing the real-time data signal to the threshold signal to produce an alarm signal when the real-time data signal is not compliant with the threshold signal.

2. A method according to claim 1, said step of generating a real-time data signal comprising the sub-steps of:

measuring the force required to pull the soil-analyzing plow tip through the soil, the sleeve friction of the soil, the pore pressure of the soil and the total pull force applied by the pulling mechanism to the plow; and combining the measured data according to an algorithm predetermined to produce a signal indicative of the composition of the soil being analyzed by the soil-analyzing plow tip.

3. A method according to claim 2, said sub-step of measuring further comprising measuring the depth of the soil-analyzing plow tip.

* * * * *